Patented Jan. 15, 1946

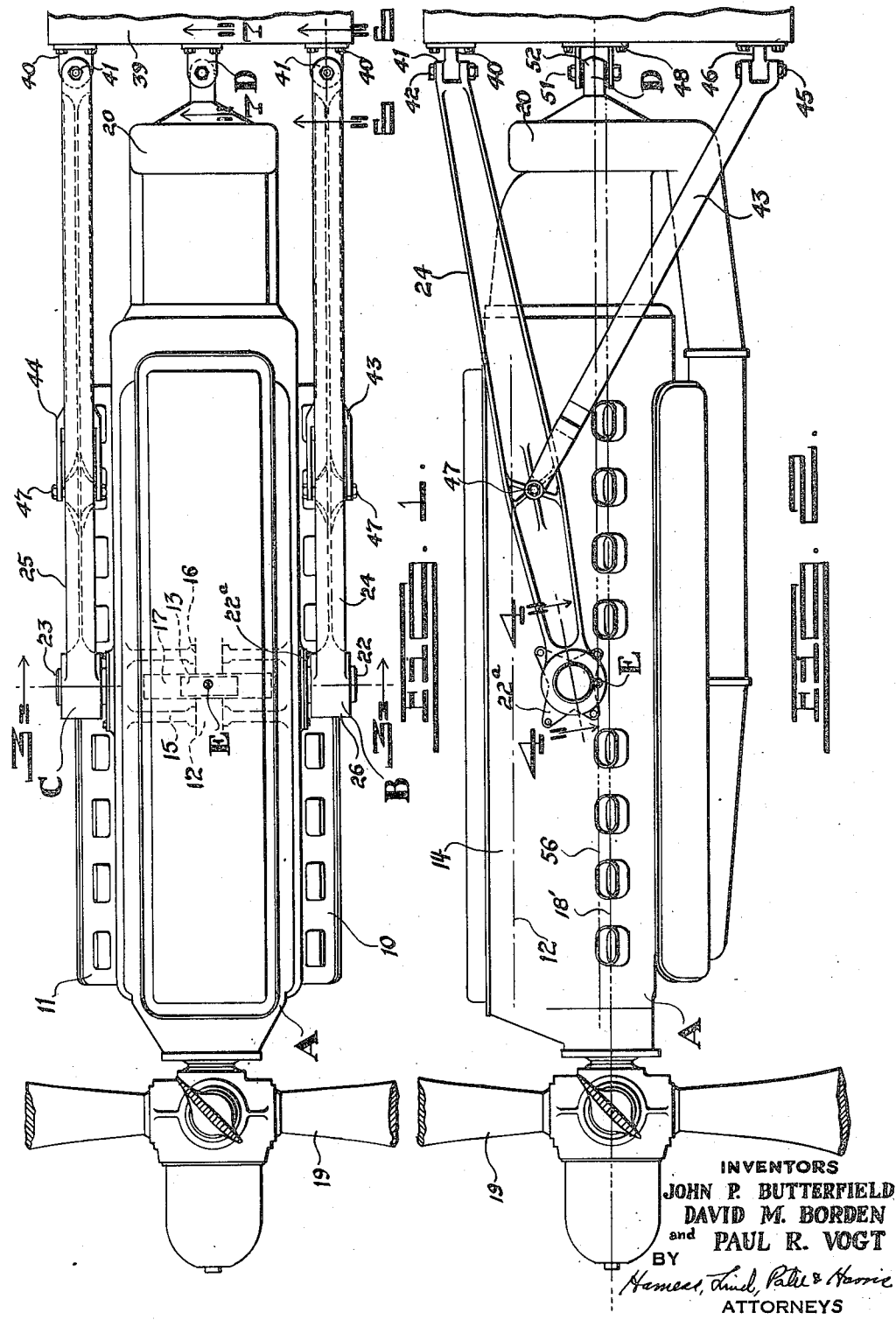

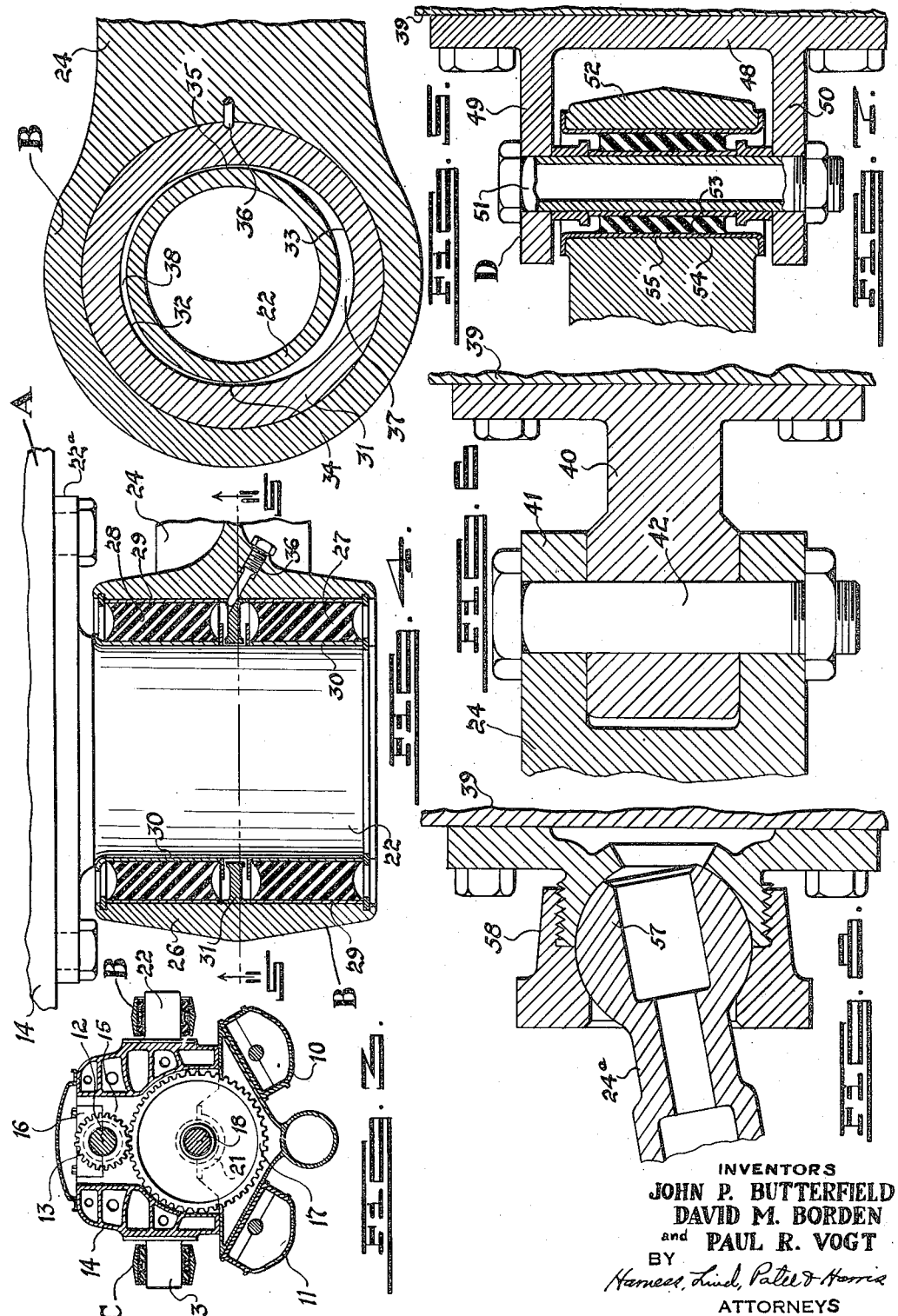

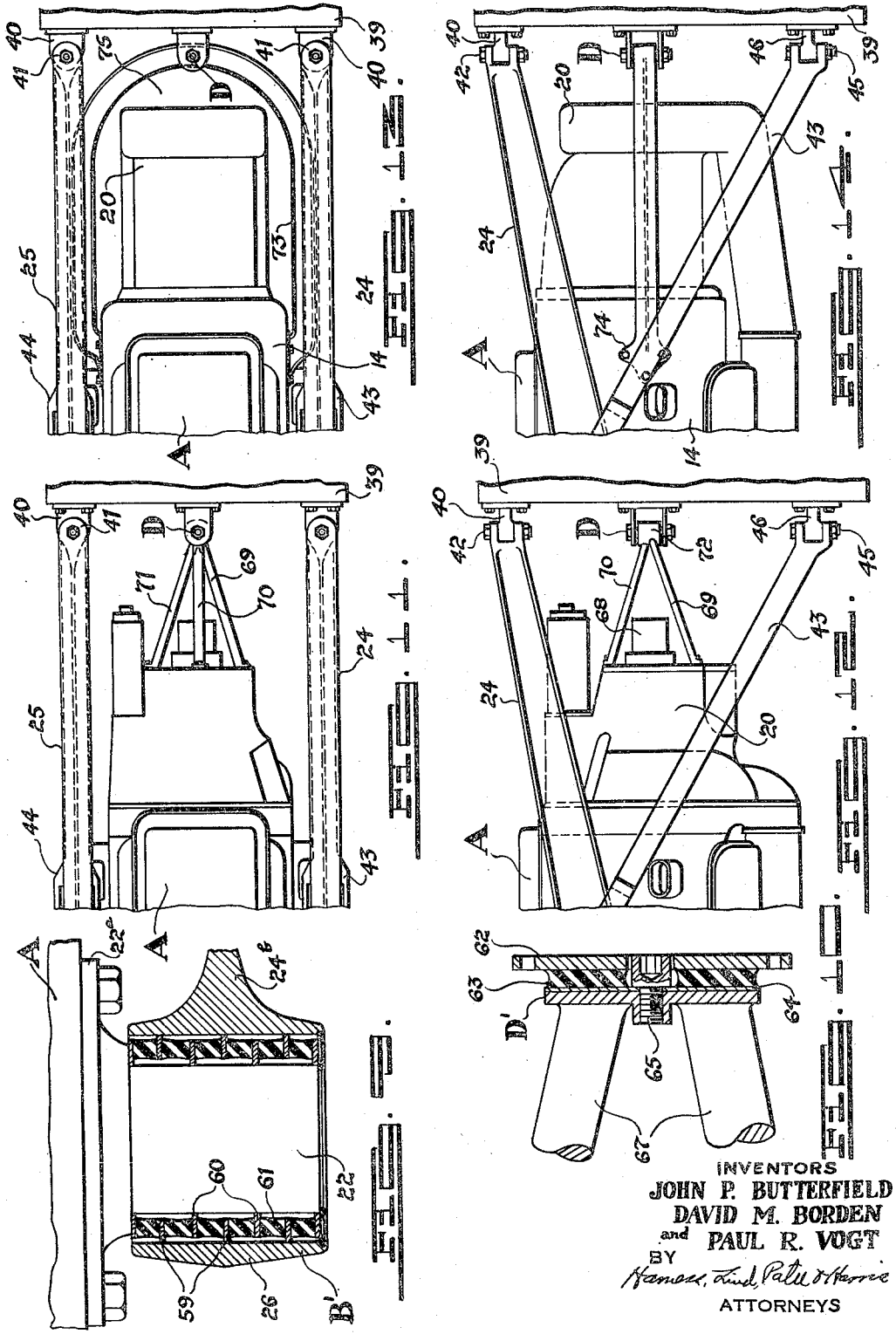

2,393,141

UNITED STATES PATENT OFFICE 2,393,141

POWER PLANT MOUNTING AND METHOD

John P. Butterfield, Highland Park, David M. Borden, Royal Oak, and Paul R. Vogt, Highland Park, Mich., assignors to Chrysler Corporation, Highland Park, Mich., a corporation of Delaware Application January 5, 1942, Serial No. 425,676

18 Claims. (Cl. 248—5)

This invention relates to power plant supports and refers more particularly to improvements in supporting or mounting systems and methods for aircraft engines and combined engines and propellers.

Our invention contemplates a supporting system and method especially adapted, although not necessarily limited, for use in connection with engines of very high power output according to present-day standards, viz., engines having in the neighborhood of 2000 horsepower output and higher. While the principles of our invention are advantageously useable in connection with engines of any power capacity, engines of the aforesaid relatively great output present problems which are given particular consideration by our invention. Furthermore, in its broader aspects, our invention is not necessarily limited to the support of aircraft engines but may be usefully employed wherever masses are subjected to problems of a kindred nature although some of the problems dealt with are believed to be peculiar to aircraft practice.

In connection with high output aircraft engines, the engine casing is ordinarily subjected to very severe stresses which cause destructive distortion effects at the cylinders, bearings, points of fluid seal, etc. Such difficulties are even more pronounced in engines incorporating reduction gearing power take-off wherein the engine casing is ordinarily called on to transmit the torque reaction throughout all or a part of its length between the zone or region of the gearing and the engine supporting structure. In order to illustrate the principles of our invention we have therefore elected to deal with a type of engine which presents many problems heretofore generally recognized as not having been satisfactorily solved, such engine being of the liquid cooled tandem cylinder type wherein one or more banks of cylinders are arranged longitudinally of the engine crankshaft.

Where it is desired to employ reduction gearing power take-off we preferably arrange such gearing intermediate the length of the engine crankshaft and, by preference, midway of such length. This not only minimizes torsional vibrations and stresses in the crankshaft but also is advantageous in conveniently lending itself to our supporting system which is so arranged as to supportingly engage the engine at the region of the reduction gearing. With such an arrangement the severe reaction torque at the gearing is delivered directly from the gearing to the supporting system thereby relieving the engine casing of twisting and other stresses to which it would be subjected if such reaction torque was transmitted longitudinally through the casing. Therefore, except for a central casing section in what, for convenience, may be termed the general plane of the reduction gearing, the casing is unstressed insofar as the gear torque is concerned. In engines which do not employ reduction gearing the engine, according to this phase of our invention, would nevertheless be supportingly engaged at the region of its maximum forces tending to stress the engine casing as, in this manner, the casing may be best unstressed.

Our invention further contemplates a system and method of spring support for the power plant, usually embodying the engine and one or more propellers, such that the natural frequency of vibration of the engine and propeller combination on the mounting springs is less than the natural frequency of the exciting forces originating largely from the working parts of the engine and air forces on the propeller. We have so arranged the springs relative to the mass axes of the engine and propeller combination, that we are able to de-couple the various modes of vibration.

In carrying out our mounting system, we preferably provide a three point support arrangement for the engine in which, assuming an engine mounted as customary in the forward end portion of an airplane fuselage, there are a pair of front or main supports and a third rear or auxiliary support. We employ such terms as front, forward, rear, and the like, in a relative sense and not by way of limitation as obviously the engine may be pointed rearwardly of the aircraft instead of forwardly or the engine may have any desired location relative to its particular environment.

Our three point mounting system contemplates an arrangement in which the two main supports are located in direct stress-transferring relationship with respect to the region of maximum torque stress of the engine casing such as immediately adjacent the reduction gearing, the third support being of an auxiliary nature mainly to steady the engine.

A further feature of our invention resides in isolating the aforesaid power plant from the airplane so as to break up the interaction or coupling of the various modes of motion resulting from engine and propeller vibrating forces.

Further features and advantages of our invention will be more apparent as this specification progresses, reference being made to the accompanying drawings which illustrate several embodiments of our invention and in which:

Fig. 1 represents a top plan view of our power plant and supporting system.

Fig. 2 is a side elevational view of the same.

Fig. 3 is a transverse sectional elevational view through the engine according to line 3—3 of Fig. 1.

Fig. 4 is a sectional plan view through one of the front main supports as indicated by line 4—4 of Fig. 2.

Fig. 5 is a sectional elevational view through the Fig. 4 structure according to line 5—5 of Fig. 4.

Fig. 6 is a sectional elevational view through a typical hinge support according to line 6—6 of Fig. 1.

Fig. 7 is a corresponding view through the auxiliary rear support according to line 7—7 of Fig. 1.

Fig. 8 is a view generally similar to Fig. 6 but illustrating a modified form of articulating connection.

Fig. 9 is a view generally similar to Fig. 4 but illustrating a modified form of front main support.

Fig. 10 is a view generally similar to Fig. 7 but illustrating a modified form of auxiliary rear support.

Fig. 11 is a top plan view of the rear portion of a power plant illustrating a modified arrangement of connection for the rear support.

Fig. 12 is a side elevational view of the Fig. 11 structure.

Fig. 13 is a view generally corresponding to Fig. 11 but showing a further modification.

Fig. 14 is a side elevational view of the Fig. 13 structure.

Referring to the drawings we have illustrated our invention in connection with a liquid cooled four-stroke cycle aircraft engine A of the type having its cylinders disposed in longitudinal alignment in two V-arranged inverted banks at 10 and 11 of eight cylinders each. The engine crankshaft extends generally along a longitudinal axis of rotation 12 and, midway of its length, carries a drive gear 13. The crankshaft has suitable bearings in the engine casing 14, a pair of these bearings being disposed at each side of gear 13 formed in a transverse casing web 15 and bearing cap 16. Gear 13 meshes with a larger gear 17 for driving a shaft 18 at reduced engine speed, the latter shaft extending along axis 18' forwardly to drive the propeller 19 and rearwardly for accessory drive including a supercharger for the engine intake system in the supercharger casing 20. The gear 13 is likewise suitably journalled as at 21 adjacent its opposite sides for support in webs 15.

Projecting laterally from each side of casing 14 on suitable brackets 22ᵃ fixed to the casing, are the cylindrical hollow support pins 22, 23 located approximately in the general plane of the reduction gearing 13, 17. The engine casing at its mid-section is appropriately reinforced for strength and rigidity so as to be capable of transmitting the reaction forces from the bearings 16 and 21 journalling gears 13 and 17 directly transversely of the engine to pins 22 and 23. Extending longitudinally of the engine adjacent each side thereof we have provided a side support beam or link 24, 25 each terminating forwardly in an annular bearing portion 26 surrounding the associated pin 22 or 23. These pins are seated in the bearing portions through the medium of springs preferably of a non-metallic character. However, if desired, metallic springing may be employed at all points of the power plant mounting.

In our present embodiment each spring at the front main supports B and C comprises a pair of annular bodies 27, 28 of rubber composition. For convenience of manufacture these bushings are each bonded to an outer cylindrical shell 29 and to an inner cylindrical shell 30, the shells having a snug fit respectively with the bearings 26 and support pins 22, 23 preferably so that the shells do not move relative to the bearings and pins.

Suitable stops are provided to limit the movement of the engine with respect to the beams 24, 25 under conditions which would tend to produce greater engine displacement than is desired, such as when the plane is brought out of a power dive or is sharply banked.

Referring to the main support B, Figs. 4 and 5, we have provided a stop ring 31 having an outer cylindrical surface fitted centrally in its associated bearing 26, this ring having an irregular or non-cylindrical inner surface formed by upper and lower arc portions 32, 33 respectively and joined by the front and rear abutment surface portions 34, 35 respectively. A pin 36 is threaded in the bearing 26 and engages a suitable opening in ring 31 so as to fix the ring in the illustrated relationship with respect to the bearing.

When the engine is not running, the surface portion 33 has a clearance at 37 with and below pin 22 which is greater than the clearance 38 above this pin with respect to surface portion 32. The clearances fore and aft of pin 22 with respect to abutment portions 34 and 35 are relatively small with respect to clearances 37 and 38, and the clearance at abutment 35 is less than that at abutment 34. On the other side of the engine, the corresponding ring 31 is fixed in the trunnion of beam 25 so that it lies rotated 180° with respect to the ring 31 in the trunnion of beam 24. Therefore the clearances 37 and 38 are respectively above and below pin 23 although clearances at 34 and 35 are preferably just as shown in Fig. 5.

With the propeller driving under normal load in a clockwise direction, looking front to rear or from left to right of Fig. 1, the engine torque reaction will be clockwise and this will slightly rock the engine to a position equalizing clearances at 37 and 38 at each mounting B and C. Likewise the end thrust exerted by the propeller in a forward direction will equalize the clearances at 34 and 35 at each mounting B and C. It will be apparent that the relationships of the clearances may be varied as desired, especially to accommodate the direction of torque reaction for the particular rotational direction of the engine which may be employed.

The beams 24 and 25 are of I-section to resist bending and they extend rearwardly to a convenient support such as the fuselage fire wall 39 which rigidly carries the hinge brackets 40. Each beam terminates rearwardly in a forked hinging portion 41, a vertical hinge pin 42 extending vertically through a bracket 40 and portion 41 whereby beams 24 and 25 are vertically supported but are free to swing laterally about their respective hinge pins 42.

The load is preferably additionally carried by a pair of struts 43, 44 respectively projecting from the beams 24, 25 for articulated connection with the support 39 by a vertical hinge pin 45 and bracket 46 similar to the Fig. 6 showing. The pins 45 are respectively vertically aligned with pins 42. In the drawings we have shown the struts yoked at their forward ends for connection at 47 with an intermediate portion of the respective beams 24, 25. By locating the connections 47 as closely as convenient to the respective support points B and C the beams 24, 25 will be correspondingly relieved of bending. However, because of exhaust pipes or other obstructions it is usually desirable to locate the connections 47 to the rear of the associated support points B and C.

The third of the three-point mounting system of the power plant is designated at D and comprises a stabilizing connection between some convenient point of the power plant and the relatively fixed mounting structure. In Figs. 1, 2 and 7 this support comprises a bracket 48 rigidly attached to the fire wall 39 and having support ears 49, 50 arranged in vertically spaced relationship to receive a fixed support bolt assembly 51.

The power plant is provided in this instance with a rigid supercharger casing 20 projecting from its rear end and carrying an arm 52 formed with an opening within which the bolt assembly 51 passes. This bolt assembly has, mounted in fixed relation therewith, a cylinder 53 to which the rubber cylinder 54 is bonded. An outer cylinder 55 is secured in the opening of arm 52 and is likewise bonded to the rubber body 54. The relation of the parts is such that adequate clearance is normally provided between bracket 48 and arm 52, these parts being connected by the rubber body 54. While we have shown the vertical axis of the rubber cylinder 54 as lying in a plane common with the axes of hinge pins 42 and 45 it is not necessary that such relationship be provided as the rubber body 54 might be located fore or aft of such plane.

From the foregoing it will be apparent that the power plant is supported at three points B, C and D. When reduction gearing is incorporated in the engine, as illustrated, we preferably locate the two main supports B and C at either side of the engine in the general plane or section containing the main reduction gears 13, 17 and preferably close to the position of the center of gravity of the power plant, including the propeller. The third support D is of a subsidiary nature acting chiefly to steady the engine. In the illustrated arrangement the power plant is substantially symmetrical in its mass distribution so as to locate the center of gravity approximately at the point E in the transverse plane containing the reduction gearing and main supports B and C.

With our arrangement the principal torque acting on the engine casing enters it at the reduction gearing. By placing the main supports B and C immediately adjacent the reduction gearing 13, 17 we have confined the stresses arising from this torque to a small portion of the crankcase which is sufficiently reinforced to withstand this stress, the main supports B and C providing the full reaction to this torque. Furthermore, the weight of the power plant and the vertical acceleration forces act through the center of gravity E and are likewise transferred in large measure through the reinforced section of the casing (Fig. 3) to the main supports B and C. The loads are thus concentrated in the side support beams 24, 25 and stresses in the casing as a whole are reduced to a minimum.

The support beams 24, 25 are independent of the engine casing and may be highly stressed with resulting deflection which is not harmful. However, if the stresses were taken along and through a part of the engine casing, even though reinforced, the resulting deflection would cause undesirable misalignment of bearings and cylinder bores. Inasmuch as the main supports B and C are so arranged as to take the torque reaction and heavy vertical acceleration loads, the rear mounting D has little action except as a steady rest and it and the rear part of the power plant are not subject to any large loads.

The engine and propeller unit is isolated from the supporting aircraft structure by the springs at supports B, C and D which, in the present embodiment, are in the form of rubber bodies 27, 28 and 54 so constructed and arranged that the natural frequency of the supported mass on its springs is considerably less than the frequency of the vibration force whereby the vibration force will pass only in very much diminished quantities through the springing.

The most important vibrating forces are a torque variation at, for our illustrated engine, four times engine speed acting to roll the engine, and propeller unbalance at propeller speed tending to move the engine vertically, transversely, in pitching, and in yawing. Where the mountings are located at random, vibrations in the various modes of motion mentioned above would be coupled, that is, any rolling of the engine would also cause it to pitch, yaw, and move vertically and horizontally. Conversely any one of these motions would also induce rolling under such conditions.

All multiple cylinder four-stroke cycle engines have a vibratory torque reaction which is a constant times engine speed. This constant, which for convenience of designation we term "constant of vibratory torque reaction," is the number of cylinders firing at equally spaced intervals divided by two. In our illustrated sixteen cylinder engine, we contemplate firing the engine so that, in effect, the action on the crankshaft is like two eight cylinder engines operating independently of each other. Therefore, in our illustrated engine, this constant is four. Of course, for other engines the constant will vary according to the foregoing and it is in an illustrative sense, and not by way of limiting the scope of our invention, that we refer herein to this vibratory torque reaction as occurring at four times engine speed. For example, the constant for a six cylinder is three; for a four cylinder engine, two, etc. For a two-stroke cycle engine the constant is twice the above value, or the same as the number of cylinders treated as aforesaid.

An important feature of our invention is that the three support points B, C, and D are so located as to break up the interaction or "coupling." Thus, propeller unbalance, especially aerodynamic unbalance, acting at propeller speed is prevented from exciting rolling vibration and the natural frequency in rolling can be made equal to or greater than propeller speed so long as the natural frequency is kept a reasonable amount below four times engine speed. It is desirable to make use of as high a natural frequency as will still isolate the vibration, because a high vibration frequency allows the use of stiff springs and these limit deflections due to static torque and other loads. Deflections must be limited because of the finite amount of space available under the cowling and by reason of the practical requirements for maintaining hose and control wire connections between the engine and the aircraft structure.

In general our de-coupling is accomplished as follows. The fore and aft principal axis of inertia of the power plant is located. This is the axis about which rolling vibration would occur naturally if the power plant was floating in space free from outside restraint. The principal axis of inertia in our disclosure is illustrated at 56 and, of course, passes through the center of gravity E. The two front main mountings B and C are then located on a plane perpendicular to this axis 56 and equidistant from it. The side beams 24, 25 holding these mountings are swung on hinges (Fig. 6) or otherwise articulated from the supporting aircraft structure, such as shown in Fig. 8 for example, so that they are incapable of offering resistance to transverse motion of the mounting points B and C. The engine A is in effect pivotally connected to the forward ends of the support beams 24 and 25 through the annular bodies 27 and 28 between the pins 22 and 23 and the bearing portions 26. When the beams 24 and 25 swing about the support 39 with transverse movement of the engine A, the pins 22 and 23 pivot with respect to the beams 24 and 25. This may take place because the annular bodies 27 and 28 may be stretched and compressed to a limited extent. The limit of such stretching or expansion and compression provides a limit to the pivoting of the support beams 24 and 25 with respect to the engine A. The third support D is located on the principal axis of inertia 56 at the rear of the engine and resists all side forces and acts as a vertical steady rest but does not take torque reaction. With our arrangement of supports, rolling vibration produces pivoting of the power plant about the principal axis of inertia in the same manner as if the engine were floating freely in space and therefore the rolling motion takes place independently of any other mode of vibration. Our arrangement of supports also decouples the vertical-and-pitching mode of motion from the transverse-and-yawing mode.

Springs employed at the support points B, C, and D are made of rubber for convenience. The term "rubber" as used by us in our specification and claims is employed in the broad generic sense to include the class of rubber composition bodies and equivalent non-metallic compositions suitable for the purposes outlined. The exact rate of the various springs is the result of mathematical calculation for any given set of conditions in a power plant such that, by preference, the natural frequency of the supported mass in rolling shall be, for the illustrated engine, less than four times engine speed and such that the natural frequency of such mass in vertical motion, transverse motion, pitching, and yawing shall each be less than propeller shaft speed. By locating the rear mounting D on the rolling axis 56 such mounting is thereby rendered ineffective to resist rolling and thus does not interfere with transmission of full torque through the front mountings B and C.

In general, the principal exciting forces in the engine comprise vibratory torque reaction which is of an impulse nature and mostly occurring in our engine at four times engine speed, and accidental (unavoidable from a practical standpoint) unbalance of engine parts coming in at engine speed to cause torque reactions, vertical and lateral displacements, or if such unbalances are dynamic they may cause pitching and yawing. Propeller unbalances may generally be classified as caused by weight unbalance and aerodynamic action of the blades acting as a pump. Weight unbalance is relatively small but the aerodynamic unbalance is relatively great in causing forces at propeller speed.

Our de-coupling arrangement allows us to employ rather stiff springing without running into resonance which might become destructively dangerous on the power plant and mounting. When de-coupled, the propeller forces do not excite rolling and do not act on the spring system which resists torque reaction, the propeller forces being controlled by springing acting in other directions, viz., vertically, laterally, pitching and yawing.

The power plant illustrated is such that the center of gravity at E is substantially in the vertical transverse plane through the two front supports B and C whereby these supports carry substantially the entire weight leaving the rear support D to act largely for stabilizing action. Such arrangement may of course be varied within keeping of the broad principles of our invention as defined by the appended claims.

Referring to Fig. 8 we have illustrated a modified arrangement for hinging the arms 24, 25 and struts 43, 44 to the fire wall 39 in lieu of the Fig. 6 arrangement.

In Fig. 8 the typical support member 24$^a$, corresponding to beam 24 in Fig. 6, is now of tubular formation terminating rearwardly in a ball 57 fitting in the spherical mounting 58 rigidly attached to support 39 and accommodating universal movement of power plant at its rear end. The mounting system functions just as set forth for Figs. 1 to 7.

In Fig. 9 we have illustrated a mounting B' which may be employed at each of the front supports in lieu of the mountings B and C. The typical mounting B for the beam 24$^b$ employs a plurality of radial rings 59 fixed within the bearing portion 26 and spaced from pin 22, and a second series of rings 60 fixed to pin 22 and spaced from portion 26. Rubber spring rings 61 are bonded to adjacent rings 59, 60 and are stressed in shear by the engine forces transferred to beam 24$^b$. The mounting system functions just as hereinbefore set forth. The rubber spring rings 61 permit pivoting of the pins 22 and 23 of the engine A with respect to the forward ends of beams 24$^a$ and 24$^b$ upon lateral swinging of the beams 24$^a$ and 24$^b$ with respect to the fixed support.

In Fig. 10 we have illustrated a modified form of shear rubber mounting D' which may be employed at the rear support in lieu of the mounting D. In this arrangement, the support bracket 62, which is adapted for rigid attachment to the fire wall as for bracket 48 in Fig. 7, has bonded thereto the annular rubber spring 63. This rubber body is likewise bonded to a plate 64 attached by fastener 65 to the rear face of the illustrated (at the lead line for reference character D') plate-like portion connecting the rear ends of rods 67, the latter projecting rigidly rearwardly from some suitable part of the engine. The mounting system functions just as set forth hereinbefore.

One advantage of employing the types of springing illustrated in Figs. 9 and 10 in lieu of the type shown in Figs. 4 and 7 resides in cutting down the space required, at least in certain instances, especially where the shape and volume of rubber is a consideration.

Referring to Figs. 11 and 12 we have illustrated a modified form of connection between the engine and the rear support D. In order to better accommodate certain accessories, as at 68, which might interfere with the arrangement illustrated in Fig. 1, we securely fasten a group of three reach rods 69, 70 and 71 to the rear end of the supercharger casing 20, these rods converging rearwardly at the hinge portion 72 for connection with the fire wall 39 just as illustrated in Fig. 7 for example. The mounting system functions just as hereinbefore set forth.

A further arrangement for the rear third support D is illustrated in Figs. 13 and 14 whereby, in effect, the engine structure is extended rearwardly for support independently of the accessories, including the supercharger, at the rear. Here, a supporting yoke member 73 of channeled H-section has its transversely spaced end portions rigidly secured at 74 to the opposite side of the rear end portion of the engine casing 14. The member 73 thus straddles the rear end of the power plant and extends rearwardly from these end portions at 74 in spaced relationship with respect to the engine in the end and around the rear of the engine for articulation, as in Fig. 7 for example, with the fire wall support 39. This provides a free space at 75 for accessories and the mounting as a whole functions just as previously set forth.

In instances where the center of gravity of the power plant falls fore or aft of the transverse plane through the two front main supports B and C, then the rear support D would of course be called upon to carry a portion of the weight depending on the distance of the center of gravity from such plane. However, by following the principles of our invention our de-coupling and other advantages may be obtained simply by the proper choice of springs to fit the requirements as will be readily understood.

Our mounting system is adaptable, in its broader aspects, to a variety of types of power plants either with or without a propeller.

We claim:

1. A three-point mounting for springingly supporting a power plant on a relatively stationary structure comprising, a pair of spring supports disposed on relatively opposite sides of the power plant approximately on a plane passing through the center of gravity and perpendicular to the longitudinal principal axis of inertia of the power plant, said pair of spring supports being disposed approximately equidistant from said axis, and a third spring support for an end portion of the power plant.

2. A mounting according to claim 1, and support means for said pair of spring supports having articulated connection with said stationary structure such that said pair of spring supports is free to move in a direction laterally of the power plant in response to forces inducing such movement incident to operation of the power plant, said third spring support being adapted to steady movement of the power plant.

3. A three-point de-coupling mounting for springingly supporting a unitary engine and propeller power plant on a relatively stationary structure comprising, a pair of spring supports disposed on relatively opposite sides of the power plant approximately on a plane perpendicular to the longitudinal principal axis of inertia of the power plant, said pair of spring supports being located approximately equidistant from said axis, support means for said pair of spring supports, means providing articulated supporting connection of said pair of spring supports on said stationary structure such that said pair of spring supports is free to move in a direction laterally of the power plant, and a third spring support between said stationary structure and said power plant and disposed approximately on said axis, said mountings being so constructed and arranged that rolling vibration of said power plant takes place independently of the remaining modes of vibration incident to drive of the propeller by the engine.

4. In a mounting for supporting a power plant on a relatively stationary structure, means for mounting said power plant on said structure including, a yoke-like structure embracing opposite sides of the power plant and having a portion extending around and spaced from an end of said power plant, and means for connecting said extending structure-portion to said stationary structure.

5. A mounting for supporting an engine structure on a relatively stationary structure, comprising, a pin element carried by one of said structures, a bearing element carried by the other of said structures and surrounding and spaced from said pin element, rubber spring means in said space, and means limiting relative movement between said elements as an incident to operation of said spring means comprising, a stop ring carried by one of said elements and having abutment surface portions disposed with relatively different clearances, and in abutting relationship, with respect to associated abutment surface portions of the other of said elements.

6. A mounting according to claim 5, a second pin element carried by said one structure, a second bearing element carried by said other structure and surrounding and spaced from said second pin element, second rubber spring means in the last said space, and means limiting relative movement between said second elements as an incident to operation of said second spring means comprising, a second stop ring carried by one of the said second elements and having abutment surface portions disposed with relatively different clearances, and in abutting relationship, with respect to associated abutment surface portions of the other of said second elements, said stop rings being disposed at substantially 180° of relative rotation such that maximum and minimum clearances at the abutment surface portions of one of said stop rings will respectively lie at substantially 180° of relative rotation with respect to maximum and minimum clearances at the abutment surface portions of the other of said stop rings.

7. In a mounting for supporting an engine on a relatively stationary structure, support means between the engine and said structure comprising, a pair of support beams, means connecting one end of said beams to said engine, and means providing articulating connection between the other ends of said beams and said structure, the last said means comprising a ball and socket joint for each of said beams so disposed as to allow the engine to swing sideways.

8. A mounting for springingly supporting a power plant on a relatively stationary structure comprising, a pair of relatively spaced spring supports for said power plant disposed approximately on a plane perpendicular to the longitudinal principal axis of inertia of said power plant and approximately equidistant from this axis, support means for said pair of spring supports, means providing articulated supporting connection of said pair of spring supports on said stationary structure such that these spring supports are free to move in the general direction of an element of said plane which connects these spring supports, and auxiliary spring support means connecting said power plant with said stationary structure and so disposed in relationship with said power plant that the center of rotation of the power plant on this auxiliary spring support means is approximately on said principal axis of inertia.

9. A mounting according to claim 8 wherein, the mass of said power plant, which is sprung by said pair of spring supports and said auxiliary spring support means, has its center of gravity located approximately at said plane.

10. A mounting for springingly supporting a power plant on a relatively stationary structure comprising, a pair of relatively spaced spring supports for said power plant disposed approximately on a plane perpendicular to the longitudinal principal axis of inertia of said power plant and approximately equidistant from this axis, support means for said pair of spring supports, means providing articulated supporting connection of each of said pair of spring supports on said stationary structure such that each of these spring supports is free to move about an axis which is approximately perpendicular in space to a plane element connecting these supports, and auxiliary spring support means connecting said power plant with said stationary structure and so disposed in relationship with said power plant that the center of rotation of the power plant on this auxiliary spring support means is approximately on said principal axis of inertia.

11. A mounting according to claim 10 wherein, said power plant comprises power take-off gearing disposed approximately at said plane.

12. A mounting for supporting a power plant on a relatively stationary structure, a pair of support beams extending generally longitudinally of the power plant, means connecting one end of each of said beams to the sides respectively of the power plant, means connecting the other ends of said beams to said stationary structure such that said beams are free to swing in a direction laterally of the power plant, and means connecting one end of said power plant with said stationary structure.

13. A mounting for supporting a power plant on a relatively stationary structure, a pair of support beams extending generally longitudinally of the power plant, means connecting one end of each of said beams to the sides respectively of the power plant, and means connecting the other ends of said beams to said stationary structure such that said beams are free to swing in a direction laterally of the power plant, the first said connecting means being disposed intermediate the length of said power plant and in such proximity to the center of mass of the power plant that substantially the weight of the power plant is supported by this said connecting means.

14. A mounting for supporting an engine structure on a relatively stationary structure, comprising, a pin element carried by one of said structures, a bearing element carried by the other of said structures and surrounding and spaced from said pin element, rubber spring means in said space, and means limiting relative movement between said elements as an incident to operation of said spring means comprising, a stop ring carried by one of said elements and having abutment surface portions disposed with clearances in abutting relationship with respect to abutment surface portions carried by the other of said elements.

15. A mounting for supporting an engine structure on a relatively stationary structure, comprising, a pin element carried by one of said structures, a bearing element carried by the other of said structures and surrounding and spaced from said pin element, rubber spring means in said space, and means limiting relative movement between said elements as an incident to operation of said spring means comprising, a stop-ring carried by one of said elements and presenting an annular abutment surface disposed with clearance in abutting relationship with respect to an abutment surface carried by the other of said elements, the amount of said clearance in a vertical direction being substantially greater than the amount of said clearance in a horizontal direction.

16. A de-coupling spring mounting for a power plant presenting three regions of springing support on a relatively stationary structure, a pair of spring supports for two of said regions so disposed that a horizontal plane containing these supports lies in vertically spaced relationship with respect to the center of gravity of the power plant, means providing an articulating connection of said pair of spring supports with said stationary structure such that movement of these spring supports is freely accommodated in the general direction of a line connecting these spring supports, and auxiliary spring support means for the remainder of said three regions so constructed and arranged that the center of rotation of the power plant on this auxiliary spring support means is approximately on a principal axis of inertia of the power plant.

17. A mounting for supporting an aircraft engine and propeller power plant on a relatively stationary structure, comprising a pair of spring support means, means providing articulated connection between the power plant and said stationary structure, means cooperatively relating the last mentioned means and said pair of spring support means as to accommodate natural vibratory roll of said power plant about its longitudinal principal axis of inertia, third spring support means disposed approximately on said axis between the power plant and said stationary support adapted to steady vibratory movement of the power plant, said spring support means vibrationally insulating the power plant with respect to said stationary structure and being so constructed and arranged as to de-couple modes of vibration acting as an incident to operation of the power plant such that said rolling vibration of the power plant takes place substantially free from influence by, and substantially free from influencing, vibrations of the power plant in its modes of pitching, yawing, and vertical and horizontal movements, incident to propeller unbalance.

18. A mounting according to claim 17 wherein, said pair of spring support means are disposed generally midway of the length of the power plant, said third spring support means being disposed adjacent one end of said power plant.

JOHN P. BUTTERFIELD.
DAVID M. BORDEN.
PAUL R. VOGT.